United States Patent
Aoki et al.

(10) Patent No.: US 6,872,142 B2
(45) Date of Patent: Mar. 29, 2005

(54) DAMPER MECHANISM

(75) Inventors: Tatsuyuki Aoki, Ibaraki (JP); Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/224,358

(22) Filed: Aug. 21, 2002

(65) Prior Publication Data

US 2003/0045362 A1 Mar. 6, 2003

(30) Foreign Application Priority Data

Aug. 31, 2001 (JP) .................................... 2001-263438

(51) Int. Cl.$^7$ ............................. F16D 3/66; F16D 3/14
(52) U.S. Cl. .................................... 464/68; 192/213.22
(58) Field of Search .................. 464/61–68; 192/213.2, 192/213.21, 213.22, 213.11, 213.12, 213.31, 70.17, 205

(56) References Cited

U.S. PATENT DOCUMENTS

| | | | |
|---|---|---|---|
| 3,809,198 A | * 5/1974 | Mori | ........................ 192/210.1 |
| 5,269,199 A | * 12/1993 | Umeyama | ..................... 74/574 |
| 5,580,312 A | 12/1996 | Takeuchi et al. | |
| 5,769,721 A | * 6/1998 | Tauvron et al. | ................ 464/63 |
| 5,842,922 A | * 12/1998 | Reik et al. | ...................... 464/68 |
| 6,270,417 B1 | 8/2001 | Hashimoto | |
| 6,375,575 B2 | * 4/2002 | Hashimoto | .................... 464/68 |
| 2002/0039925 A1 | 4/2002 | Uehara | |

FOREIGN PATENT DOCUMENTS

| | | |
|---|---|---|
| DE | 24 18 062 A1 | 10/1975 |
| DE | 33 23 280 C2 | 2/1984 |
| EP | 0 069 458 A1 | 1/1983 |
| EP | 0069458 A1 * | 12/1983 ........... F16D/13/68 |

OTHER PUBLICATIONS

U.S. Appl. No. 10/085,148, filed Mar. 2002, Hashimoto.

* cited by examiner

Primary Examiner—Kenn Thompson
(74) Attorney, Agent, or Firm—Shinjyu Global IP Counselors, LLP

(57) ABSTRACT

Coil springs 33 and 36 couple input and output rotary members 2 and 3 together such that they can rotate relative to each other. The coil springs 33 and 36 have a torsion characteristic having a positive region and a negative region that has a lower rigidity than the positive region. A second friction generating section 71 is arranged such that friction is generated rotationally-between the input rotary member 2 and the output rotary member 3 due to the elastic force of the coil springs 33 and 36 when the two rotary members 2 and 3 rotate relative to each other. A friction suppressing mechanism secures rotational gaps 91 and 92 on only the negative side of the torsion characteristic. These rotational gaps serve to prevent the elastic force of the coil springs 33 and 36 from acting on the second friction generating section 71 within a prescribed angular range.

20 Claims, 9 Drawing Sheets

DAMPER MECHANISM

BACKGROUND OF THE INVENTION

1. Field of the Invention

The present invention relates to a damper mechanism. More specifically, the present invention relates to a damper mechanism for absorbing and damping torsional vibrations while also transmitting torque.

2. Background Information

Conventional clutch disk assemblies used in vehicles have two basic functions. One function is to serve as a clutch for engaging with and disengaging from the flywheel. The other basic function is to serve as a damper mechanism for absorbing and damping torsional vibrations from the flywheel. In general, vehicle vibrations include idling-related noises (rattling sounds), traveling-related noises (rattling associated with acceleration and deceleration and muffled noises), and tip-in/tip-out (low frequency vibrations). The function of the clutch disk assembly as a damper is to eliminate these noises and vibrations.

Idling-related noises are rattling noises that emit from the transmission when the gear shift is put into neutral and the clutch pedal is released, for example while waiting at a traffic light. When the engine is running at a speed in the vicinity of idling speed, the engine torque is low and the torque change at the time of each explosion in the pistons of the engine is large. Thus, idling-related noises are generated. Under these conditions, the teeth of the transmission input gear and counter gear undergo a phenomenon of striking against one another.

Tip-in and tip-out (low frequency vibrations) refer to large-scale lengthwise shaking of the vehicle that occurs when the accelerator pedal is depressed or released suddenly. If the rigidity of the drive transmission system is low, the torque transmitted to the tires is transmitted back from the tires as torque and the resulting lurching reaction causes excessive torque to be generated at the tires. As a result, longitudinal vibrations that shake the vehicle on a large scale back and forth occur in a transitional manner.

In the case of idling noises the problem lies in the vicinity of the zero torque portion of the torsion characteristic of the clutch disk assembly. It is usually better for the torsional rigidity to be low. Conversely, it is necessary for the torsion characteristic of the clutch disk assembly to be as rigid as possible to suppress the longitudinal vibrations caused by tip-in and tip-out.

In order to solve this problem, a clutch disk assembly has been proposed which has a two-stage characteristic obtained by using two types of spring members. The first stage or low twisting angle region of the torsion characteristic has a low torsional rigidity and low hysteresis torque and thus provides a noise preventing effect during idling. Meanwhile, the second stage or high twisting angle region of the torsion characteristic has a high torsional rigidity and high hysteresis torque and is thus sufficiently capable of damping the longitudinal vibrations of tip-in and tip-out.

Also known is a damper mechanism that efficiently absorbs small torsional vibrations during the second stage of the torsion characteristic by not allowing the large friction mechanism of the second stage to operate when small torsional vibrations are inputted due to such factors as combustion fluctuations in the engine.

In order to prevent the large friction mechanism from operating when small vibrations are transmitted due to, for example, engine combustion fluctuations, it is necessary for the high-rigidity spring member to be compressed and for a rotational gap of a prescribed angle to be secured between the high-rigidity spring member and the large friction mechanism.

The angular magnitude of this rotational gap is relatively small, i.e., approximately 0.2 to 1.0 degrees. The rotational gap exists in both the positive side second stage, which corresponds to the input plate being twisted in the rotational drive direction (positive direction) with respect to the spline hub, and the negative side second stage, which corresponds to the input plate being twisted in the opposite direction (negative direction) with respect to the spline hub.

Conventionally, the rotational gap is realized using the same mechanism on both the positive side second stage and the negative side second stage. Consequently, the rotational gap is always produced on both the positive side and the negative side of the torsion characteristic. However, depending on the characteristics of the vehicle, there are situations where it is preferred that the magnitude of the rotational gap be different on the positive and negative sides of the torsion characteristic. It is also possible to have a situation where it is desirable not to provide the rotational gap at all on one side, i.e., either the positive side or the negative side. More specifically, the situation would call for having the rotational gap on the negative side of the torsion characteristic in order to reduce the peak vibrations that occur at the resonance rotational speed during deceleration. However, in front-engine and front-drive or FF vehicles, the resonance peak often remains in the region of practical engine speeds and the noise and vibration performance in the vicinity of the resonance rotational speed will worsen if a rotational gap is provided on the positive side of the torsion characteristic. Meanwhile, the tip-in and tip-out damping performance will degrade if the damper mechanism is structured such that high hysteresis is not produced on the negative side of the torsion characteristic.

In view of the above, there exists a need for a damper mechanism that overcomes the above-mentioned problems in the prior art. This invention addresses this need in the prior art as well as other needs, which will become apparent to those skilled in the art from this disclosure.

SUMMARY OF THE INVENTION

An object of the present invention is to achieve preferred vibration damping performance by causing the positive side and negative side of the torsion characteristic to differ appropriately.

Another object of the present invention is effect a difference in the positive side and negative side of the torsion characteristic using a simple structure.

A damper mechanism in accordance with a first aspect of the present invention is provided with the following: an input rotary member, an output rotary member, an elastic member, a friction generating mechanism, and a friction suppressing mechanism. The output rotary member is arranged such that it can rotate relative to the input rotary member. The elastic member couples the input rotary member and output rotary member together such that the rotary members can rotate relative to each other. An elastic member torsion characteristic has a positive region that corresponds to when input rotary member being twisted in a rotational direction with respect to the output rotary member and a negative region that corresponds to the input rotary member being twisted in the opposite direction. The negative region is configured to have a lower rigidity than the positive region. The friction generating mechanism is arranged such that friction is generated rotationally between the input rotary member and the output rotary member by the action of the elastic force of the elastic member when the two rotary members rotate relative to each other. The friction suppressing mechanism secures a rotational gap on only the negative side of the torsion characteristic for preventing the elastic force of the elastic member from acting on the friction generating mechanism within a prescribed angular range.

This damper mechanism achieves a prescribed rigidity on the positive side (acceleration side) of the torsion characteristic and a rigidity lower than the prescribed rigidity on the negative side (deceleration) of the torsion characteristic. As a result, the damper mechanism can suppress rotational speed fluctuations that occur when a resonance point is passed on the positive side of the torsion characteristic and obtain a good damping rate over the entire negative side of the torsion characteristic. More specifically, the friction suppressing mechanism has a rotational gap only on the negative side of the torsional characteristic and does not produce high hysteresis torque with respect to small torsional vibrations. Consequently, if this damper mechanism is used in a FF vehicle or other vehicle for which the resonance peak remains in the region of practical engine speeds, the resonance peak on the positive side of the torsion characteristic can be made smaller while maintaining the tip-in and tip-out damping performance. Furthermore the noise level of the negative side can be held to a low level.

A damper mechanism in accordance with a second aspect of the present invention is provided with the following: a first rotary member, a second rotary member, an elastic member, and an intermediate rotary member. The second rotary member is arranged such that it can rotate relative to the first rotary member. The elastic member couples the first and second rotary member together such that they can rotate relative to each other. The elastic member has a torsion characteristic that includes a positive region and a negative region. The positive region corresponds to whichever of the first and second rotary members on the input side is twisted in the rotational direction with respect to whichever rotary member is on the output side. The negative region corresponds to the input-side rotary member being twisted in the opposite direction with respect to the output-side rotary member. The intermediate rotary member has a frictional engaging section and a gap engaging part. The frictional engaging section frictionally engages the first rotary member. The gap engaging part engages the second rotary member while securing a prescribed rotational gap for preventing the elastic force of the elastic member from acting on the friction generating mechanism within a prescribed angular range. The intermediate rotary member is stopped such that it cannot rotate with respect to the second rotary member on one side, i.e., either the positive side or the negative side, of the torsion characteristic.

With this damper mechanism, torque is transmitted between the first rotary member and the second rotary member through the elastic member. When torsional vibrations are inputted, the elastic member is compressed and the frictional engaging section of the intermediate rotary member slides on the first rotary member, and the torsion vibrations are dampened and absorbed by means of a prescribed torsion characteristic. On one side of the torsion characteristic, the gap engaging part of the intermediate rotary member rotates integrally with the second rotary member and the frictional engaging section slides against the input and second rotary member. However, when small torsional vibrations are inputted and the first rotary member and second rotary member are rotating relative to each other within a prescribed angular range, the rotational gap prevents the elastic force of the elastic member from acting on the intermediate rotary member. As a result, the frictional engaging section does not slide against the second rotary member.

Conversely, on the other side of the torsion characteristic, the intermediate rotary member cannot rotate relative to the second rotary member even when small torsional vibrations are inputted and the first rotary member and the second rotary member are rotating relative to each other within a prescribed angular range. Consequently, the elastic member exerts an elastic force on the intermediate rotary member and, as a result, the frictional engaging section slides against the first rotary member. Thus, in this aspect, a simple structure can be used to form a friction suppressing mechanism that does not generate friction within a prescribed range of twisting angles on only one side of the torsion characteristic.

A damper mechanism in accordance with a third aspect of the present invention is a damper mechanism according to the second aspect, wherein the gap engaging part has first and second gap engaging parts arranged so as to engage with the second rotary member from both rotational directions. The second gap engaging part is pressed by the elastic member in the rotational direction against the second rotary member on only one side, i.e., either the positive side or the negative side, of the torsion characteristic.

In this damper mechanism, the second engaging section of the gap engaging part of the intermediate rotary member is pressed against the second rotary member by the elastic member. Consequently, the intermediate rotary member cannot rotate with respect to the second rotary member on either the positive side or the negative side of the torsion characteristic.

A damper mechanism in accordance with a fourth aspect of the present invention is a damper mechanism according to the third aspect, wherein the second rotary member has a window hole in which the elastic member is housed. Further, the second gap engaging part is disposed between one rotationally facing side of the elastic member and a rotationally facing end of the window hole.

In this damper mechanism, the second gap engaging part is arranged between the elastic member and the housing section inside the window hole of the second rotary member. Consequently, on one side of the torsion characteristic, the second gap engaging part is pressed against the housing section by the elastic member. As a result, the intermediate rotary member cannot rotate with respect to the second rotary member. Meanwhile, on the other side of the torsion characteristic, the second gap engaging part can separate from the housing section and the intermediate rotary member can rotate with respect to the second rotary member.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
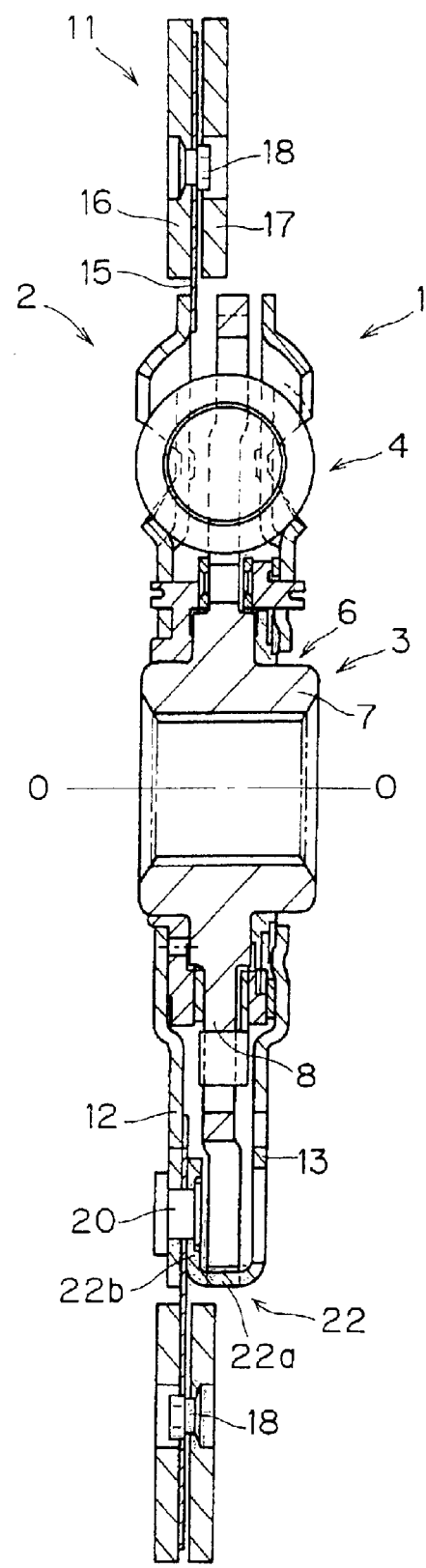
FIG. 1 is a vertical cross-sectional view of a clutch disk assembly in accordance with a first embodiment of the present invention.
Figure 2:
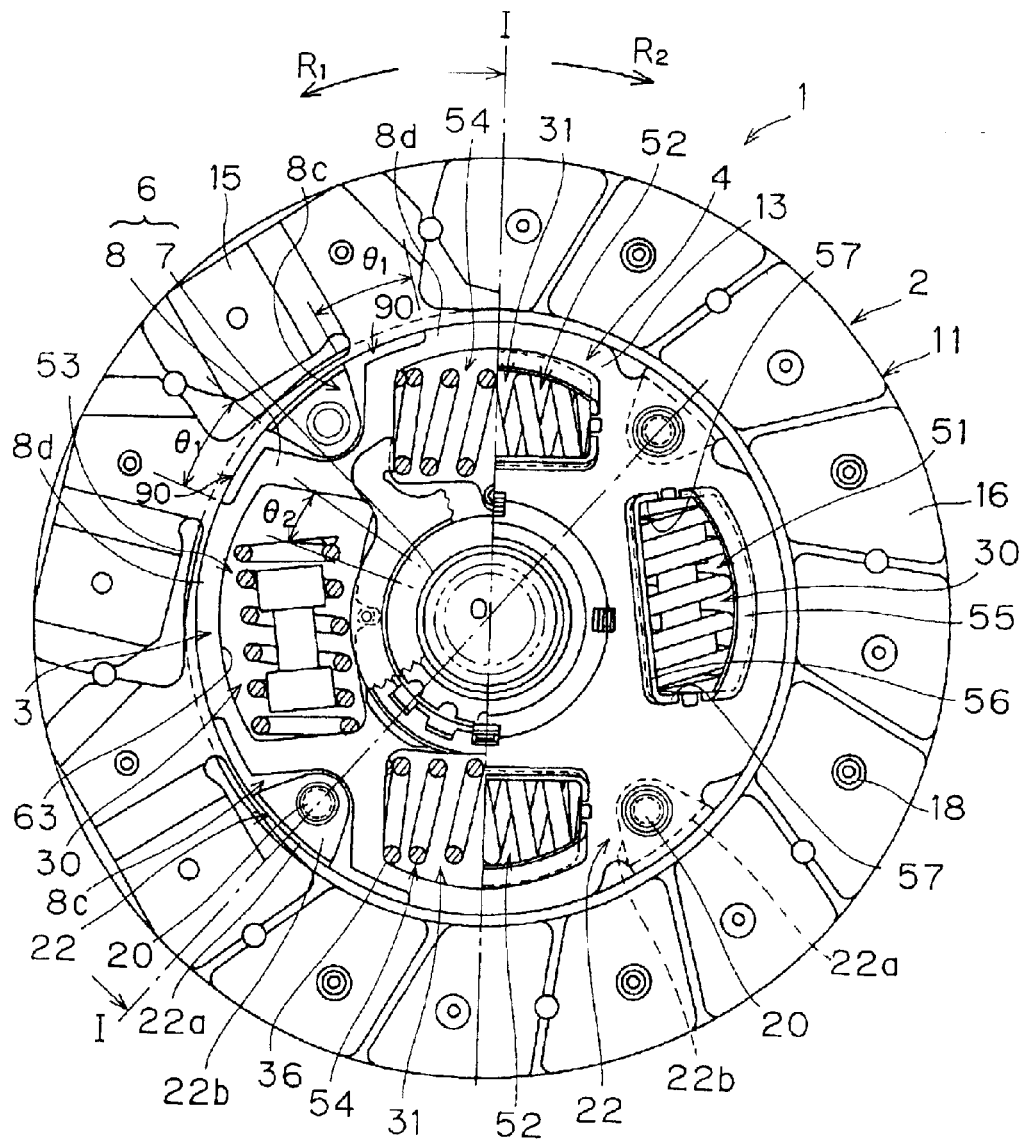
FIG. 2 is an elevational view of the clutch disk assembly with sections removed for illustrative purposes.

FIG. 1 is a cross-sectional view of a clutch disk assembly 1 in accordance with a preferred embodiment of the present invention. FIG. 2 is an elevational view of the same. The clutch disk assembly 1 is a power transmission device used in a clutch device of a vehicle (particularly an FF vehicle). The clutch disk assembly 1 has a clutch function and a damper function. The clutch function is provided to connect and disconnect torque by engaging the clutch disk assembly 1 with and disengaging it from a flywheel (not shown). The damper function is provided to absorb and damp torque fluctuations received from the flywheel side using springs or the like.

Line O—O in FIG. 1 represents a rotational axis of the clutch disk assembly 1. The engine and flywheel (not shown) are disposed to the left in FIG. 1 and the transmission (not shown) is disposed to the right in FIG. 1. In FIG. 2, the rotational direction indicated by arrow R1 is the drive direction or positive rotational direction of the clutch disk assembly 1 and the rotational direction indicated by arrow R2 is the opposite direction or negative rotational direction. In the following explanations, the terms "rotational (circumferential) direction," "axial direction," and "radial direction" refer to the respective directions of the clutch disk assembly 1 as a rotary body unless otherwise specified.

As seen in FIG. 1, the clutch disk assembly 1 chiefly has an input rotary member 2, an output rotary member 3, and an elastic coupling mechanism 4 disposed between the rotary members 2 and 3. Together these members constitute a damper mechanism that serves to transmit torque while also damping torsional vibrations. The input rotary member 2 is a member to which torque is delivered from the flywheel (not shown). The input rotary member 2 chiefly has a clutch disk 11, a clutch plate 12, and a retaining plate 13. The clutch disk 11 is a portion that is pressed against and coupled with the flywheel (not shown). The clutch disk 11 has a cushioning plate 15 and a pair of friction facings 16 and 17. The pair of friction facings 16 and 17 are fixed to both axially facing sides of the cushioning plate with rivets 18. The clutch plate 12 and the retaining plate 13 are both preferably made of sheet metal having an annular disk shape and are disposed with a prescribed spacing therebetween in the axial direction. The clutch plate 12 is disposed on the engine side and the retaining plate 13 is disposed on the transmission side of the clutch disk assembly 1. A plurality of coupling parts 22 is formed on an outside edge of the retaining plate 13 with equal spacing in the circumferential direction. The plurality of coupling parts 22 is preferably four in number. Each coupling part 22 preferably has an extended part 22a, is integral with the retaining plate 13, and extends in the axial direction. The fastening part 22b extends radially inward from a tip of the extended part 22a. The fastening parts 22b are fastened to a transmission-facing surface of the clutch plate 12 by a plurality of rivets 20, thus causing the clutch plate 12 and the retaining plate 13 to rotate as a single unit while determining the axial spacing therebetween. Additionally, the rivets 20 fasten the inner circumferential section of the cushioning plate 15 to the fastening parts 22b and the outer circumferential section of the clutch plate 12. The clutch plate 12 and the retaining plate 13 are each formed with a center hole. A boss 7 (discussed later) is disposed inside these center holes. As seen in FIG. 2, a plurality of window parts 51 and 52 is arranged in the circumferential direction and provided in both the clutch plate 12 and the retaining plate 13. The window parts 51 and 52 have the same shape and are preferably arranged circumferentially at identical positions in the radial direction. There are preferably four window parts 51 and 52 in each plate 12 and 13. The window parts 51 and 52 are elongated in roughly the circumferential direction.

Figure 6:
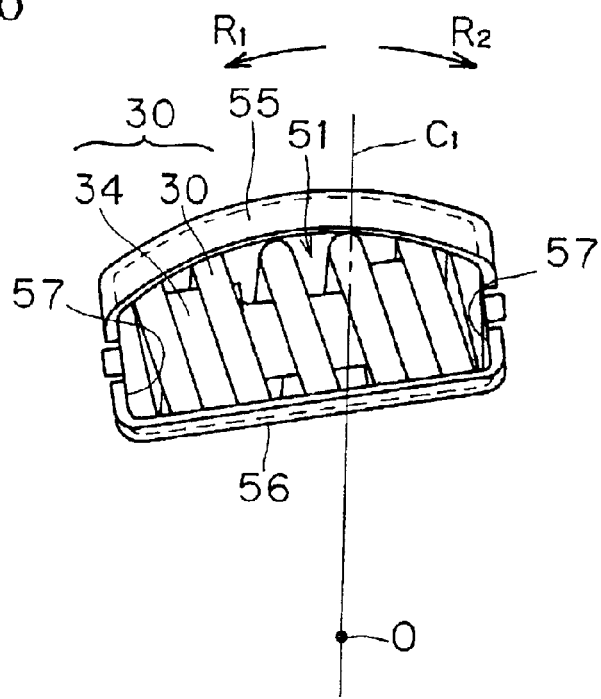
FIG. 6 is an enlarged partial view of FIG. 2 illustrating an elevational view of the first elastic member assembly.

The pair of window parts 51 arranged opposite each other in the horizontal direction in FIG. 2 is designated as first window parts 51 and the pair of window parts 52 arranged opposite each other in the vertical direction in FIG. 2 is designated as second window parts 52. Since the shapes of the first window parts 51 and the second window parts 52 are substantially identical, the shapes are simultaneously described here. As shown in FIG. 6, the window parts 51 and 52 each have a hole that passes through the plate 12 or 13 in the axial direction and a support section that is formed along the edge of the hole. The support section has a radially outside support part 55, a radially inside support part 56, and rotational direction support parts 57. In an elevational view, the radially outside support part 55 is curved into a shape that roughly follows the circumferential direction. Further, the radially inside support part 56 is roughly linear. The rotational direction support parts 57 extend linearly in roughly the radial direction and are parallel to a line passing through center O of the clutch disk assembly 1 and the circumferential center of its respective window part 51 or 52. The radially outside support part 55 and the radially inside support part 56 are raised in the axial direction from the other portions of the plates.

Figure 4:
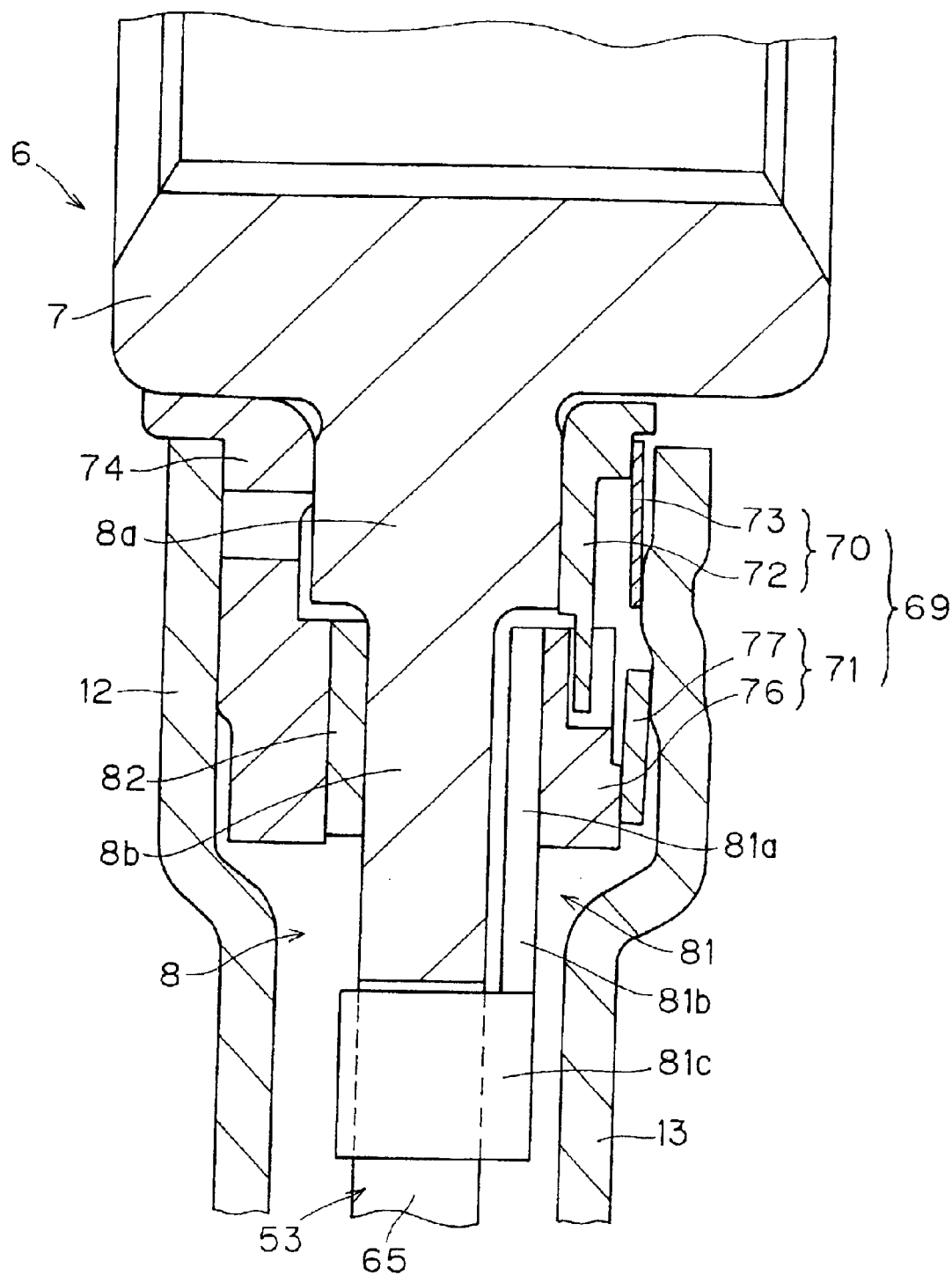
FIG. 4 is an enlarged partial view of FIG. 1 illustrating a vertical cross-sectional view of the friction generating mechanism.

Referring to FIG. 1, the output rotary member 3 is described. The output rotary member 3 chiefly has a hub 6. The hub 6 has a boss 7 and a flange 8. The boss 7 is a cylindrical member disposed inside the center holes of the clutch plate 12 and the retaining plate 13. The boss 7 is splined to a transmission input shaft (not shown) inserted into the center hole thereof. The flange 8 is a circular disc-shaped portion that is formed integrally with the outer circumference of boss 7 and extends radially outward. The flange 8 is disposed axially between the clutch plate 12 and the retaining plate 13. As shown in FIG. 4, the flange 8 has an inner circumferential section 8a and an outer circumferential section 8b. The inner circumferential section 8a is the innermost portion of the flange. The outer circumferential section 8b is provided on the outside of the inner circumferential section 8a and is narrower than the same in the axial direction.

Figure 5:
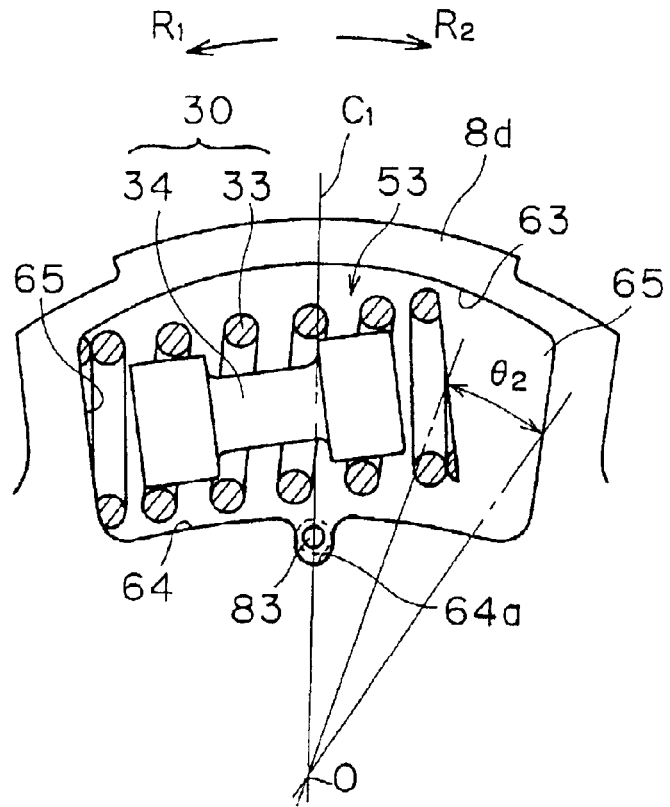
FIG. 5 is an enlarged partial view of FIG. 2 illustrating an elevational view of a first elastic member assembly of the clutch disk assembly with sections removed for illustrative purposes.

As seen in FIG. 2, window holes 53 and 54 correspond to the window parts 51 and 52 and are provided in the outer circumferential section 8b of the flange 8. In other words, preferably four window holes 53 and 54 are arranged circumferentially at substantially identical positions relative to the window parts 51 and 52 in the radial direction. The pair of window holes 53 arranged opposite each other in the horizontal direction in FIG. 2 is designated as first window holes 53, and the pair of window holes 54 arranged opposite each other in the vertical direction in FIG. 2 is designated as second window holes 54. Since the shapes of first window holes 53 and second window holes 54 are roughly the same, the shapes are simultaneously described. Referring to FIG. 5, each of the window holes 53 and 54 is a hole that has been preferably punched into the flange 8 in the axial direction and is elongated in the circumferential direction. Each window hole 53 and 54 has a radially outside support part 63, a radially inside support part 64, and rotational direction support parts 65. In an elevational view, the radially outside support part 63 has a curved shape that follows the circumferential direction and the radially inside support part 64 is roughly linear. The rotational direction support parts 65 extend linearly in roughly the radial direction. More specifically, the rotational direction support parts 65 are parallel to a line passing through the center O of the clutch disk assembly 1 and the circumferential center of its respective window hole 53 or 54. The radially inside support part 64 is provided with at least one notch 64a. The notch 64a is preferably located on the line that line passes through the center O of the clutch disk assembly 1 and the circumferential center of its respective window hole 53 or 54. The notch 64a preferably is convex in a direction toward the center O of the clutch disk assembly. More preferably, the apex of the notch 64a lies on the line that passes through the center O of the clutch disk assembly 1 and the circumferential center of its respective window hole 53 or 54.

As seen in FIG. 2, the first window holes 53 are preferably longer in the circumferential direction than the second window holes 54. Further, the first window parts 51 are preferably shorter in the rotational direction than the first window holes 53 and rotationally nearer to the R1 side of the first window holes 53. Consequently, the rotational direction support part 57 on the R1 side of the first window part 51 is aligned with the rotational direction support part 65 on the R1 side of the first window hole 53 but the rotational direction support part 57 on the R2 side of the first window part 51 separated in the R1 direction from the rotational direction support part 65 on the R2 side of the first window hole 53 by angle $\theta_2$. The circumferential length and circumferential positioning of the second window holes 54 and the second window parts 52 are preferably the same.

Notches 8c are formed in the outside edge of the flange 8 such that fastening parts 22b of the retaining plate 13 can pass therethrough in the axial direction. The notches 8c are positioned rotationally between the window holes 53 and 54. Further, the coupling parts 22 of the retaining plate 13 can pass therethrough in the axial direction.

Protruding parts 8d that protrude in the radially outward direction are provided on the outside edge of the flange 8 at portions thereof that are radially outside window holes 53 and 54. The protruding parts 8d form a rotational gap 90 between the flange 8 and the extended parts 22a of the coupling parts 22. In this embodiment, the angular magnitude $\theta_1$ of the rotational gap 90 is the same in both rotational directions. Thus, the coupling parts 22 and the protruding parts 8d form a stopper mechanism of the clutch disk assembly 1.

The elastic coupling mechanism 4 has a plurality of elastic member assemblies 30 and 31. This embodiment uses four elastic member assemblies 30 and 31. The elastic member assemblies 30 and 31 are arranged inside the window holes 53 and 54 and the window parts 51 and 52, respectively. There are preferably two types of elastic member assemblies 30 and 31, first elastic member assemblies 30 and second elastic member assemblies 31. The first elastic member assemblies 30, which are arranged inside the first window holes 53 and the first window parts 51. The second elastic member assemblies 31 are arranged inside the second window holes 54 and the second window parts 52.

The first elastic member assemblies 30 are explained with reference FIGS. 5 and 6. The first elastic member assemblies 30 each have a first coil spring 33 and a float body 34 disposed inside the coil spring 33. The first coil spring 33 is supported at both rotationally facing ends thereof by both rotational direction support parts 57 of the first window parts 51. Therefore, the first coil spring 33 is disposed nearer to the R1 side inside window hole 53. More specifically, the end of first coil spring 33 facing in the R1 direction abuts against or is very close to the rotational direction support part 65 of the window hole 53, but the end of first coil spring 33 facing in the R2 direction is separated from the rotational direction support part 65 of the window hole 53 by angle $\theta_2$ in the rotational direction. The float body 34 is an elastic body arranged such that it can move in the rotational direction inside the first coil spring 33. The float body 34 is made preferably of rubber, resin, or the like and is used to produce a sufficiently large stopper torque when the twisting angle is large. Referring to FIG. 2, each second elastic body assembly 31 has a second coil spring 36. Both ends of the second coil spring 36 abut against or are very close to both rotational direction support parts 57 of the second window part 52 and the rotational direction support parts 65 of the second window hole 54.

As seen in FIG. 4, the clutch disk assembly 1 is also provided with a friction generating mechanism 69 arranged such that it acts in parallel with the elastic coupling mechanism 4. The friction generating mechanism 69 has a first friction generating section 70 for generating low hysteresis torque and a second friction generating section 71 for generating high hysteresis torque. The first friction generating section 70 is a mechanism that serves to generate hysteresis torque over the entire region in which the elastic coupling mechanism 4 operates, i.e., on both the positive side and negative side of the torsion characteristic. The first friction generating section 70 has a first bush 72, a first cone spring 73, and a second bush 74. The first bush 72 and the first cone spring 73 are preferably disposed between the inner circumferential section 8a of the flange 8 and the inner circumferential section of the retaining plate 13. The first bush 72 is a washer-like member and has a friction surface that slidably touches against the surface of inner circumferential section 8a of the flange 8 that faces toward the transmission in the axial direction. The first cone spring 73 is disposed axially-between the first bush 72 and the inner circumferential section of the retaining plate 13 and is compressed in the axial direction. The second bush 74 is an annular member mounted to the internal surface of the clutch plate 12. The internal surface of the second bush 74 touches against the external surface of the boss 7. In this manner, the clutch plate 12 and the retaining plate 13 are positioned in the radial direction with respect to the hub 6. The second bush 74 also has a friction surface that slidably touches against the surface of the inner circumferential section 8a of the flange 8 that faces toward the engine in the axial direction.

In summary, the first friction generating section 70 is structured such that the elastic force of the first cone spring 73 causes the first and second bushes 72 and 74, which rotate integrally with the clutch plate 12 and the retaining plate 13, to be pressed in the axial direction against the flange 8 such that the bushes 72 and 74 can slide against the flange 8 in the rotational direction.

Figure 3:
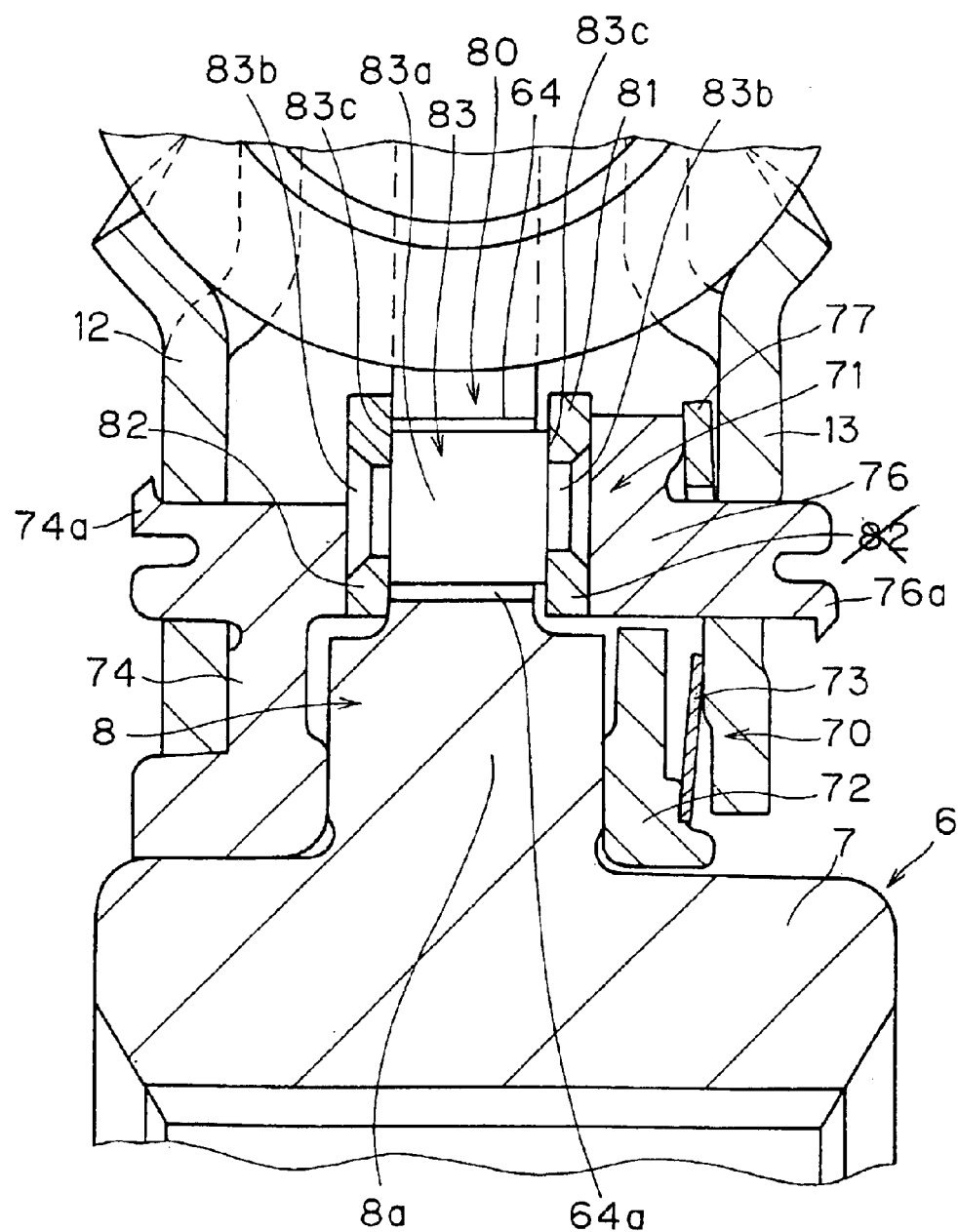
FIG. 3 is an enlarged partial view of FIG. 1 illustrating a vertical cross-sectional view of a friction generating mechanism of the clutch disk assembly.

Referring to FIG. 3, the second friction generating section 71 has a third bush 76, a second cone spring 77, and an intermediate rotary member 80. The intermediate rotary member 80 is disposed between the input rotary member 2 and the output rotary member 3 such that it can rotate relative thereto. In addition to engaging with the output rotary member 3 in the rotational direction, the intermediate rotary member 80 forms the second friction generating section 71 between itself and the input rotary member 2. Furthermore, the intermediate rotary member 80 can rotate relative to the output rotary member 3 within a prescribed angular range on the negative side of the torsion characteristic but rotates integrally with the output rotary member 3 on the positive side of the torsion characteristic.

Figure 8:
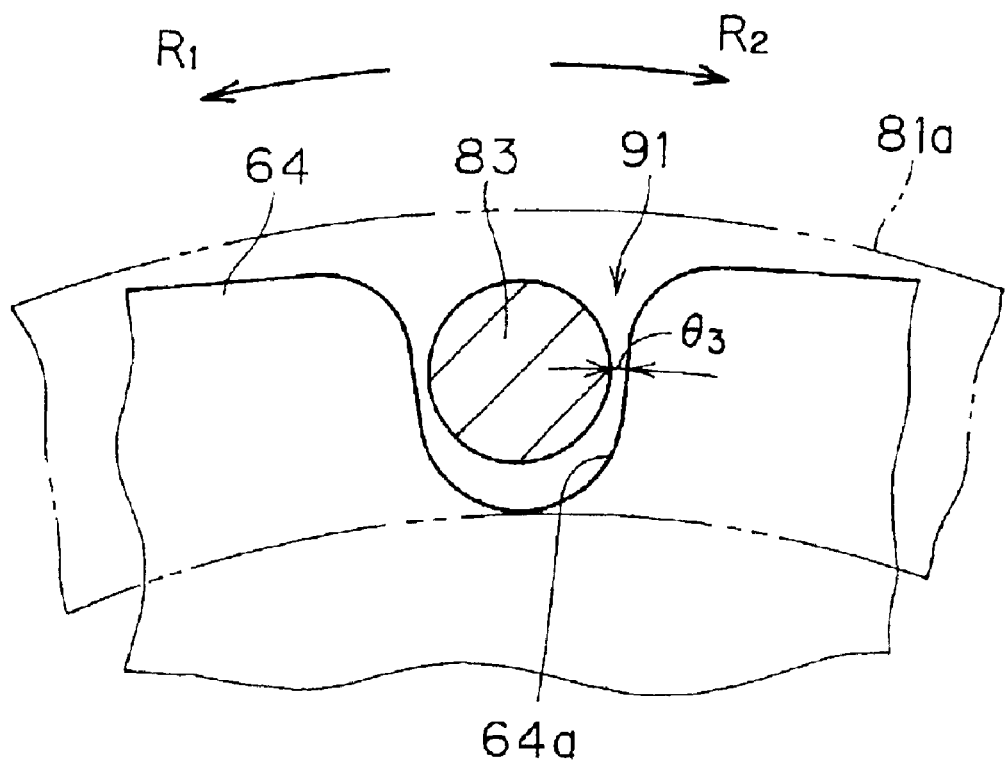
FIG. 8 is a partial elevational view that highlights a relationship between pins and notches of the clutch disk assembly.

The intermediate rotary member 80 has a first plate member 81, a second plate member 82, and pins 83. The first plate member 81 and the second plate member 82 are annular members disposed on both axially facing sides of an inner circumferential portion of the flange 8. More specifically, the first and second plate member 81 and 82 are preferably disposed on the innermost annular portion of the outer circumferential section 8b, i.e., the annular portion that is located more toward the outside in the radial direction than the inner circumferential section 8a and more toward the inside in the radial direction than the window holes 53 and 54. The first plate member 81 is disposed on the side of the flange 8 that faces toward the transmission in the axial direction, and the second plate member 82 is disposed on the side of the flange 8 that faces toward the engine in the axial direction. The pins 83 include a trunk section 83a that extends in the axial direction and insert sections 83b that extend further in the axial direction than and from both ends of trunk section 83a. Since the insert sections 83b are smaller in diameter than the trunk section 83a, shoulder sections 83c are formed on both axially facing ends of the trunk section 83a. Holes for inserting the insert sections 83b are formed in the first plate member 81 and the second plate member 82. The engagement of the pins 83 causes the first plate member 81 and the second plate member 82 to rotate integrally as a single unit. Also, the first plate member 81 and the second plate member 82 touch against the shoulder sections 83c of the trunk section 83a in axial direction and thus the axial spacing between the first plate member 81 and the second plate member 82 is determined. Furthermore, since the axial length of the trunk section 83a is larger than the thickness of the flange 8 in the axial direction, the first plate member 81 and the second plate member 82 do not contact the respective axially facing surfaces of the outer circumferential section 8b of the flange 8 and, as is clear in FIG. 3, a gap is secured axially between the first plate member 81 and the surface of the outer circumferential section 8b of the flange 8 that faces toward the transmission in the axial direction. The pins 83 are provided at two locations that are opposite each other in the radial direction such that they extend inside the notches 64a of the first window holes 53. As stated, each notch 64a is a portion that extends in the radially inward direction from the radially inside support part 64 of the first window hole 53. The pins 83 are arrange to extend in the notches 64a. A first rotational gap 91 is formed between the pins 83 and R2 side of the notches 64a. As shown in FIG. 8, the angular magnitude of the first rotational gap 91 in the circumferential direction is $\theta_3$. $\theta_3$ is preferably 0.6 degree in this embodiment and preferably lies in the range of 0.2 to 1.0 degree.

Figure 7:
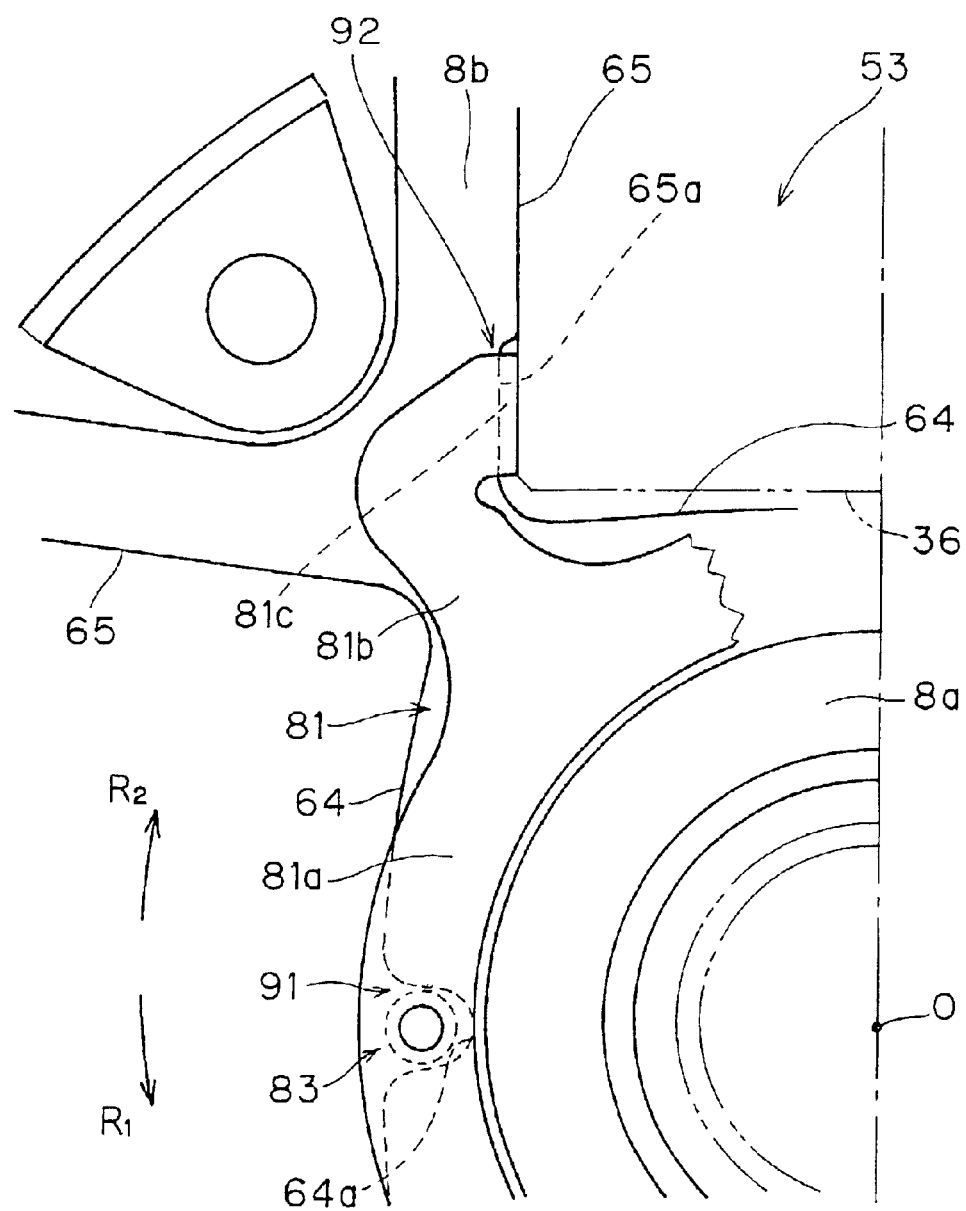
FIG. 7 is an enlarged partial view of FIG. 2 illustrating an elevational view that highlights the relationship between a flange and an intermediate rotary member of the clutch disk assembly.

Referring to FIGS. 3 and 4, the first plate member 81 has an annular part 81a a pair of arms 81b, claw parts 81c. The annular part 81a engages with the pins 83. The pair of arms 81b extend in the radially outward direction from the annular part 81a. The claw parts 81c extend in the axial direction from the tips of the arms 81b. As shown in FIG. 7, each of pair of arms 81b extends to the vicinity of the rotational direction support part 65 on the R1 side of a first window hole 53 in the flange 8. Each claw part 81c is disposed inside a recessed part 65a formed in an inner circumferential portion of the rotational direction support part 65 of a first window hole 53. Further, each claw part 81c forms a linear spring bearing surface that is uninterrupted with respect to the other portions of the rotational direction support part 65. Consequently, the claw parts 81c of the intermediate rotary member 80 are pinched between the rotational direction support part 65 on the R1 side of the first window holes 53 and the R1 end of the second coil springs 36. The claw parts 81c can separate from the flange 8 in the R2 rotational direction but cannot move in the R1 rotational direction.

Figure 10:
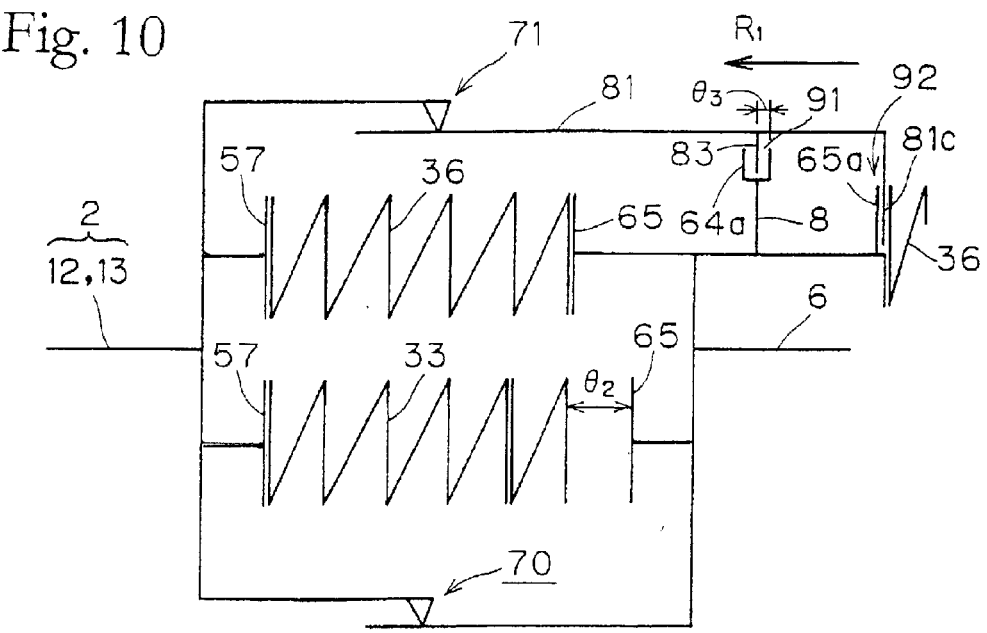
FIG. 10 is a diagrammatical view of the damper mechanism of the clutch disk assembly.

Referring to FIGS. 7 and 8, the relationship between the intermediate rotary member 80 and the flange 8 can be summarized as follows. The intermediate rotary member 80 cannot rotate relative to the flange 8 in the R1 direction because the claws 81c touch against the rotational direction support part 65 on the R1 side of first window holes 53. On the other hand, the intermediate rotary member 80 can rotate relative to the flange 8 in the R2 direction until the pins 83 touch against the R1 side of the notches 64a. As shown in FIG. 10, in short, the claws 81c can separate from the recessed part 65a by an angle of $\theta_3$ in the R2 rotational direction to form the second rotational gap 92. Thus, the intermediate rotary member 80 can rotate relative to the flange 8 within the range of angle $\theta_3$, which is formed in the first rotational gap 91 and the second rotational gap 92.

As seen in FIGS. 3 and 4, the third bush 76 and the second cone spring 77 are disposed axially between the annular part 81a of the first plate member 81 and an inner circumferential section of the retaining plate 13, i.e., to the outside of the first bush 72 and the first cone spring 73 in the radial direction. The third bush 76 has a friction surface that touches against the surface of the annular part 81a (friction engaging section) of the first plate member 81 on a side of the annular part 81a facing toward the transmission in the axial direction. The third bush 76 also has a protrusion 76a that extends from the annular main body portion in the axial direction and is inserted into a hole formed the retaining plate 13. Due to this engagement, the third bush 76 can move in the axial direction but cannot rotate relative to the retaining plate 13. The second cone spring 77 is disposed axially between the third bush 76 and an inner circumferential section of the retaining plate 13, and is compressed therebetween in the axial direction. A recessed part that engages in the rotational direction with a protrusion that extends from first bush 72 is formed in the inner circumferential section of the third bush 76. Due to the aforementioned engagement, the first bush 72 rotates integrally with third bush 76 and the retaining plate 13.

The second bush 74 has a portion that is disposed between the second plate member 82 and an inner circumferential section of the clutch plate 12. The portion of the second bush 74 has a friction surface that touches against the surface of the second plate member 82 (frictional engaging section) that faces toward the engine in the axial direction. A plurality of protrusions 74a extends from the annular main body toward the engine in the axial direction. The protrusions 74a are formed on the second bush 74. The protrusions 74a fit into holes formed in the clutch plate 12. Consequently, the second bush 74 can move in the axial direction but cannot rotate relative to the clutch plate 12.

In summary, the second friction generating section 71 is structured such that the elastic force of the second cone spring 77 causes the second and third bushes 74 and 76, which rotate integrally with the clutch plate 12 and the retaining plate 13, to be pressed in the axial direction against the intermediate rotary member 80 such that the bushes 74 and 76 can slide against the intermediate rotary member 80 in the rotational direction. The hysteresis torque generated by the second friction generating section 71 is considerably larger, i.e., 10 to 20 times larger, than the hysteresis torque generated by the first friction generating section 70.

Figure 9:
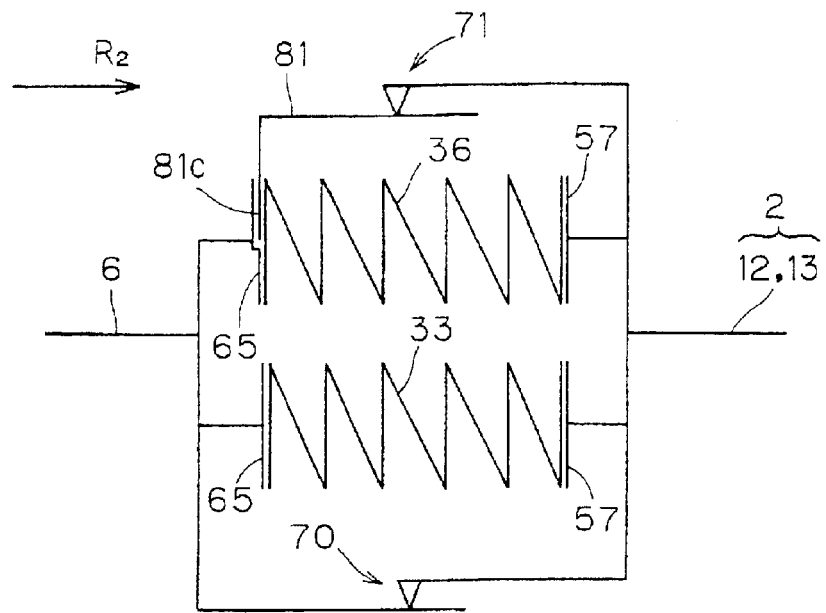
FIG. 9 is a diagrammatical view of a damper mechanism of the clutch disk assembly.
Figure 11:
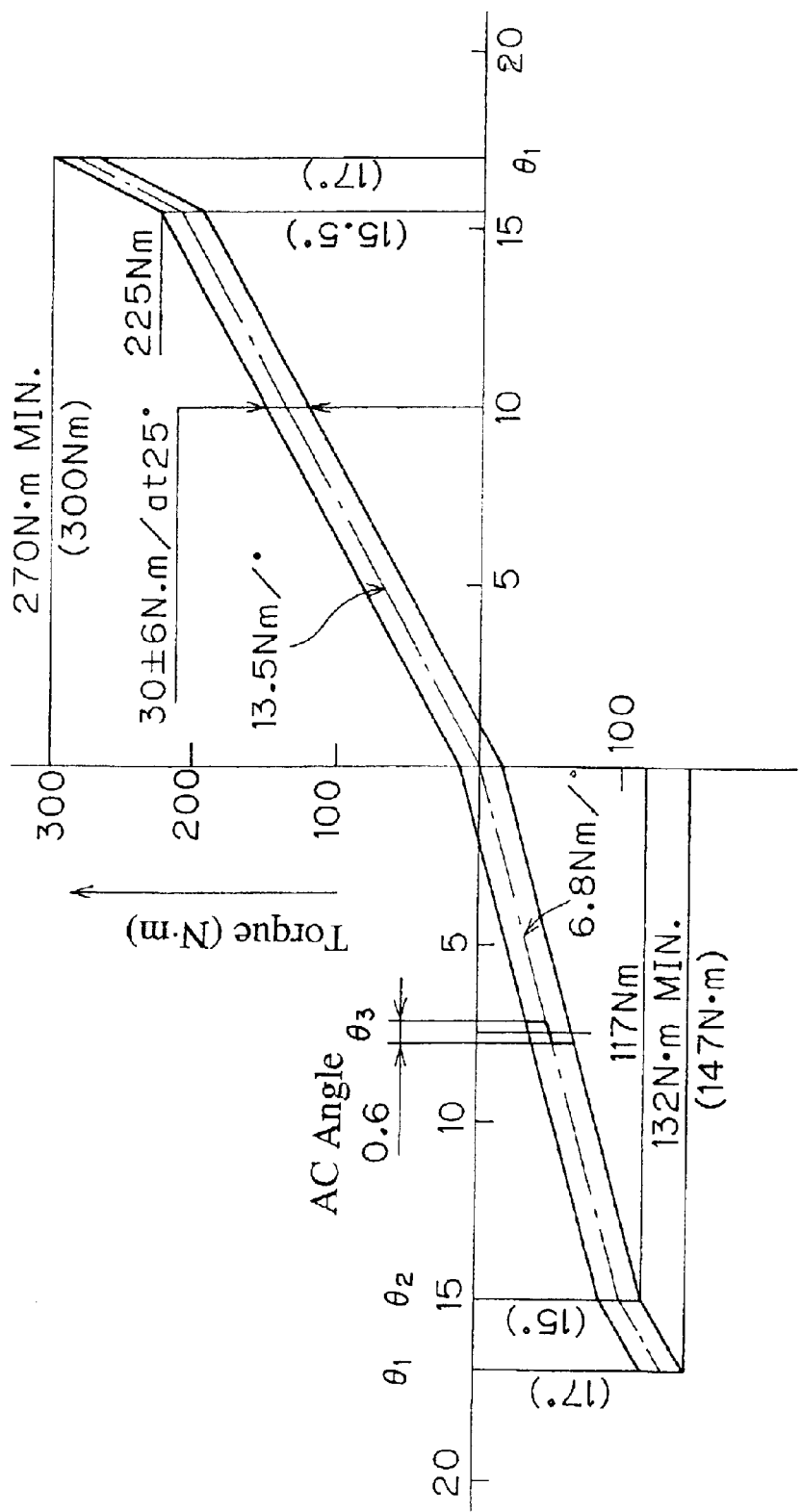
FIG. 11 is diagrammatical view of a torsion characteristic of the clutch disk assembly.

Next, the torsion characteristic of the clutch disk assembly 1 is described using the damper mechanism modeling diagrams shown in FIGS. 9 and 10 and the torque characteristic diagram shown in FIG. 11. The specific numeric values described with reference to FIG. 11 are merely used to present this embodiment of the present invention. The present invention is not limited to these values.

First, operation in the positive region of the torsion characteristic is explained for a case where, starting from the neutral state shown in FIG. 9, the input rotary member 2 is fixed and the hub 6 is twisted relative thereto in the R2 rotational direction. Here, the input rotary member 2 is twisted in the R1 rotational direction with respect to the output rotary member 3. In a region of small twisting angles, the two first coil springs 33 and the two second coil springs 36 are compressed in parallel and a characteristic of high rigidity is obtained. Also, the first friction generating section 70 and the second friction generating section 71 operate and a characteristic of high hysteresis torque is obtained. In the second friction generating section 71, the intermediate rotary member 80 rotates integrally with the flange 8 in the R2 rotational direction and slides against the bushes 74 and 76 because the claw parts 81c are pressed against the rotational direction support part 65 on the R1 side of the first window holes 53.

When small torsional vibrations are delivered to the clutch disk assembly 1 on the positive side of the torsion characteristic, the claw parts 81c of the intermediate rotary member 80 are continuously pressed against the rotational direction support part 65 on the R1 side of the first window holes 53 by the second coil springs 36. Consequently, the intermediate rotary member 80 cannot rotate relative to the flange 8 and the elastic forces of the coil springs 33 and 36 act continuously on the second friction generating section 71 through the intermediate rotary member 80 in spite of the small torsional vibration input. In short, when the input rotary member 2 and the output rotary member 3 rotate relative to each other on the positive side of the torsion characteristic, the second friction generating section 71 operates continuously and high hysteresis torque is generated.

Next, operation in the negative region of the torsion characteristic is explained for a case where, starting from the neutral state shown in FIG. 10, the input rotary member 2 is fixed and the hub 6 is twisted relative thereto in the R1 rotational direction. Here, the input rotary member 2 is twisted in the R2 rotational direction with respect to the output rotary member 3.

In a region of small twisting angles, only the two second coil springs 36 are compressed and a characteristic having a lower rigidity when compared to the positive side is obtained. In other words, the two first coil springs 33 are not initially compressed. Also, the first friction generating section 70 and the second friction generating section 71 operate and a characteristic of high hysteresis torque is obtained. In the second friction generating section 71, the intermediate rotary member 80 rotates integrally with the flange 8 in the R1 rotational direction and slides against the bushes 74 and 76 when the pins 83 are pressed against the R2 side of the notches 64a. Thus, the claw parts 81c separate from the recessed parts 65a by angle $\theta_3$ in the R2 rotational direction.

When the twisting angle reaches $\theta_2$, the rotational direction support part 65 on the R2 side of each first window hole 53 touches against the end of the first coil spring 33 that faces in the R2 direction. Once this stage is reached, the two first coil springs 33 are compressed in parallel with the two second coil springs 36. As a result, a torsion characteristic having high rigidity and high hysteresis torque is obtained.

Next, the torsion characteristics obtained when various types of torsional vibrations are received by the clutch disk assembly 1 are explained in detail using the torsion characteristic diagram shown in FIG. 11.

When torsional vibrations having a large amplitude, such as longitudinal vibrations of the vehicle, occur, the clutch disk assembly 1 oscillates back and forth across both the positive and negative sides of a torsion characteristic. When this occurs, the longitudinal vibrations of the vehicle are damped rapidly by the high hysteresis torque generated on both the positive and negative sides of the torsion characteristic.

Next, consider an example in which small torsional vibrations are imparted to the clutch disk assembly 1 due to engine combustion fluctuations when the vehicle is decelerating while using engine breaking. In this case, the intermediate rotary member 80 rotates relative to the flange 8 within the first rotational gap 91 and the second rotational gap 92 and does not slide against the bushes 74 and 76 in the second friction generating section 71. As a result, high hysteresis torque is not produced in response to small torsional vibrations. In other words, within the range of gap angle $\theta_3$ on the torsion characteristic diagram, the second coil springs 36 operate but no sliding occurs in the second friction generating section 71. Thus, within the range of twisting angle $\theta_3$, a hysteresis torque (the hysteresis torque provided by the first fiction generating section 70) much smaller than the hysteresis torque of the negative side of the torsion characteristic is obtained. It is preferred that the hysteresis torque in the range of $\theta_3$ be approximately 1/10 the hysteresis torque across the entire torsion characteristic. In this way, the vibrations and noise level associated with engine breaking can be greatly reduced because a rotational gap has been provided on the negative side of the torsion characteristic such that the second friction generating section 71 does not operate within a prescribed angular range.

Since a rotational gap that prevents the second friction generating section 71 from operating within a prescribed angular range is not provided on the positive side of the torsion characteristic, there is no degradation of the noise and vibration performance in the vicinity of the resonance rotational speed in such vehicles as FF vehicles, in which the resonance peak often remains in the region of practical engine speeds.

In short, the noise and vibration performance for both acceleration and deceleration is improved by securing a rotational gap that prevents the friction mechanism from operating within a prescribed angular range on only one side, i.e., the positive side or negative side, of the torsion characteristic.

As described heretofore, the damper mechanism of the present invention achieves an overall preferred torsion characteristic by not only having different torsional rigidities on the positive and negative sides of the torsion characteristic but also providing on only one side of the torsion characteristic a structure that does not allow high hysteresis torque to be generated in response to small torsional vibrations.

In particular, the damper mechanism of the present invention uses a simple structure that incorporates the intermediate rotary member 80 to achieve a friction suppressing mechanism that does not allow high hysteresis torque to be generated in response to small torsional vibrations on one side only of the torsion characteristic. More specifically, the intermediate rotary member 80 can rotate relative to the flange 8 within the range of the first and second rotational gaps 91 and 92, which are provided by the pins 83 (first gap engaging part) and the claw parts 81c (second gap engaging part) at two locations that are separated in the rotational direction. Thus, the intermediate rotary member 80 functions both as a friction member that frictionally slides against the input rotary member 2 and a friction suppressing mechanism that prevents the generation of friction in a prescribed range of twisting angles. The claw parts 81c of the intermediate rotary member 80 are pinched between the rotational direction support part 65 on the R1 side of the second window parts 53 in the flange 8 and the end of the coil springs 36 facing in the R1 direction. Consequently, on the positive side of the torsion characteristic, the claw parts 81c are continuously pressed against the rotational direction support part 65 of the second window parts 53 by the second coil springs 36 and cannot move in the R2 rotational direction with respect to the flange 8. In short, on the positive side of the torsion characteristic, the intermediate rotary member 80 rotates integrally with the flange 8 even when small torsional vibrations are received. Meanwhile, on the negative side of the torsion characteristic, the ends of the second coil springs 36 that face in the R1 rotational direction are separated in the R2 rotational direction from the rotational direction support parts 65 of the second window parts 53. Consequently, the claw parts 81c can separate in the R2 rotational direction from the recessed parts 65a. In short, when small torsional vibrations are received on the negative side of the torsion characteristic, the intermediate rotary member 80 can rotate relative to the flange 8 within the range of twisting angle $\theta_3$.

The structure of the clutch disk assembly that utilizes the present invention is not limited to that of the previously described embodiment. For example, the present invention can also be applied to a structure in which the boss and flange of the hub are separated and coupled by the damper mechanism.

The damper mechanism of the present invention can also be applied to devices other than clutch disk assemblies. For example, it can be used as a damper mechanism for elastically coupling two flywheels in the rotary direction.

With the damper mechanism of the present invention, the negative side of the torsion characteristic has lower rigidity than the positive side and has a rotational gap for preventing the generation of high hysteresis torque in response to small torsional vibrations. Therefore, a preferred noise and vibration performance is obtained on both the positive and negative sides of the torsion characteristic.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-263438. The entire disclosure of Japanese Patent Application No. 2001-263438 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism comprising:

an input rotary member;

an output rotary member being arranged to rotate relative to said input rotary member;

an elastic member being configured to couple said input rotary member and said output rotary member together such that said input rotary member and said output rotary member can rotate relative to each other, said elastic member having a torsion characteristic comprising a positive region corresponding to said input rotary member being twisted in a rotational direction with respect to said output rotary member and a negative region having a lower rigidity than said positive region and corresponding to said input rotary member being twisted in an opposite direction;

a friction generating mechanism being arranged to generate rotational friction between said input rotary member and said output rotary member due to the action of an elastic force of said elastic member when said input rotary member and said output rotary member rotate relative to each other; and a friction suppressing mechanism being configured to secure a rotational gap only in said negative region of said torsion characteristic to prevent said elastic force of said elastic member from acting on said friction generating mechanism within a prescribed angular range.

2. The damper mechanism according to claim 1, wherein said friction suppressing mechanism comprises a first plate member, a second plate member, and at least one pin.

3. The damper mechanism according to claim 2, wherein said first plate member is configured to be fixed to said output rotary member in said positive region and releasable with respect to said output rotary member within a prescribed angular range in said negative region.

4. The damper mechanism according to claim 3, wherein said at least one pin is configured to extend axially through an aperture of said output rotary member.

5. The damper mechanism according to claim 4, wherein said pin is configured to contact said output rotary member only in said negative region.

6. The damper mechanism according to claim 5, further comprising,
a first rotational gap defined by an angle extending from a first contact point of said pin to a rotational center of said damper mechanism and from said rotational center to a second contact point of said output rotary member, said pin is configured to contact said second contact point, and said first rotational gap is in the range of 0.2° to 1.0°.

7. The damper mechanism according to claim 6, wherein said first rotational gap is 0.6°.

8. The damper mechanism according to claim 7, wherein said friction generating mechanism comprises a first friction generating section and a second friction generating section configured to generate high hysteresis torque relative to said first friction generating section.

9. The damper mechanism according to claim 8, wherein said first friction generating section is configured to generate hysteresis torque in both said positive and negative regions.

10. The damper mechanism according to claim 9, wherein said second friction generating section is configured to generate a hysteresis torque larger than that of said first friction generating section.

11. The damper mechanism according to claim 10, wherein
said second friction generating section is configured to generate 10 to 20 times more hysteresis torque than said first friction generating section.

12. The damper mechanism according to claim 11, wherein
said second friction generating section comprises said friction suppressing mechanism.

13. The damper mechanism according to claim 1, wherein said friction generating mechanism comprises a first friction generating section configured to generate hysteresis torque and a second friction generating section configured to generate a higher hysteresis torque than that generated by said first friction generating section.

14. The damper mechanism according to claim 13, wherein
said first friction generating section is configured to generate hysteresis torque in both said positive and negative regions.

15. The damper mechanism according to claim 14, wherein
said second friction generating section is configured to generate a larger hysteresis torque than said first friction generating section.

16. The damper mechanism according to claim 15, wherein
said second friction generating section is configured to generate 10 to 20 times more hysteresis torque than said first friction generating section.

17. The damper mechanism according to claim 16, wherein
said second friction generating section comprises said friction suppressing mechanism.

18. A damper mechanism comprising:
a first rotary member;
a second rotary member being arranged to rotate relative to said first rotary member;
an elastic member being configured to couple said first rotary member and said second rotary member together such that said input rotary member and said output rotary member can rotate relative to each other, said elastic member having,
a torsion characteristic comprising a positive region corresponding to one of said first and second rotary members being on an input side being twisted in a rotational direction with respect to the other of said first and second rotary members being on an output side, and
a negative region corresponding to said one of said first and second rotary members being on said input side being twisted in an opposite direction with respect to said other of said first and second rotary members being on said output side; and
an intermediate rotary member having a frictional engaging section being configured to engage frictionally said first rotary member and a gap engaging part being configured to engage said second rotary member while securing a prescribed rotational gap to prevent an elastic force of said elastic member from acting on said friction generating mechanism within a prescribed angular range, said intermediate rotary member being prevented from rotating with respect to said second rotary member in one of either said positive region or said negative region of said torsion characteristic.

19. A damper mechanism as recited in claim 18, wherein
said gap engaging part has first and second gap engaging parts arranged so as to engage with said second rotary member from both rotational directions, and
said second gap engaging part is pressed by said elastic member in said rotational direction against said second rotary member on only one side of either said positive region or said negative region of said torsion characteristic.

20. A damper mechanism as recited in claim 19, wherein
said second rotary member has a window hole in which said elastic member is housed and
said second gap engaging part is disposed between one rotationally facing side of said elastic member and a rotationally facing end of said window hole.

* * * * *